(12) United States Patent
Lynn et al.

(10) Patent No.: US 9,299,070 B2
(45) Date of Patent: Mar. 29, 2016

(54) VIRTUAL RECEIPTS

(71) Applicant: Verizon Patent and Licensing Inc., Arlington, VA (US)

(72) Inventors: Ian Lynn, San Leandro, CA (US); Lodema M. Steinbach, Clayton, CA (US); Zhijian Lin, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/467,699

(22) Filed: Aug. 25, 2014

(65) Prior Publication Data

US 2016/0055470 A1    Feb. 25, 2016

(51) Int. Cl.
| | |
|---|---|
| *G06Q 30/04* | (2012.01) |
| *G06Q 20/20* | (2012.01) |
| *H04W 4/14* | (2009.01) |
| *G06Q 20/32* | (2012.01) |
| *G06Q 20/04* | (2012.01) |

(52) U.S. Cl.
CPC ............ *G06Q 20/202* (2013.01); *G06Q 20/322* (2013.01); *H04W 4/14* (2013.01); *G06Q 20/0453* (2013.01); *G06Q 20/209* (2013.01)

(58) Field of Classification Search
CPC   G06Q 20/322;  G06Q 20/0453;  G06Q 20/209
USPC ......................................................... 235/379
See application file for complete search history.

(56) References Cited

U.S. PATENT DOCUMENTS

| | | | |
|---|---|---|---|
| 8,892,462 B1* | 11/2014 | Borovsky et al. ............... 705/17 |
| 2009/0104920 A1* | 4/2009 | Moon et al. ................. 455/456.3 |
| 2011/0307342 A1* | 12/2011 | Haji ................................. 705/24 |
| 2012/0160911 A1* | 6/2012 | Smith et al. .................... 235/379 |
| 2013/0144706 A1* | 6/2013 | Qawami et al. ............. 705/14.27 |
| 2013/0221093 A1* | 8/2013 | Patel et al. ..................... 235/379 |
| 2014/0100925 A1* | 4/2014 | Popescu et al. .............. 705/14.4 |
| 2014/0164193 A1* | 6/2014 | Ando et al. ..................... 705/30 |
| 2014/0195361 A1* | 7/2014 | Murphy et al. ................. 705/21 |
| 2014/0236714 A1* | 8/2014 | Fukasawa et al. .......... 705/14.51 |
| 2015/0120478 A1* | 4/2015 | Jang et al. ....................... 705/24 |
| 2015/0149312 A1* | 5/2015 | Cancro et al. ................... 705/24 |

* cited by examiner

*Primary Examiner* — Thien M Le
*Assistant Examiner* — Claude J Brown

(57) ABSTRACT

A device may obtain receipt data associated with a purchase of an item. The device may generate information for generating a virtual receipt based on the receipt data. The device may determine a user device associated with the receipt data. The device may send a text message, that includes the information for generating the virtual receipt, to the user device. The virtual receipt may be generated by the user device based on the information for generating the virtual receipt.

20 Claims, 10 Drawing Sheets

700 ⟶

User Device

VIRTUAL RECEIPTS

BACKGROUND

After making a purchase, a consumer may be provided a paper receipt. The paper receipt may identify each item that the consumer purchased, the price paid for each item, the date of the purchase, a name of a retailer that sold the items to the consumer, the location at which the purchase was made, and the like.

DETAILED DESCRIPTION OF PREFERRED EMBODIMENTS

Figure 1:
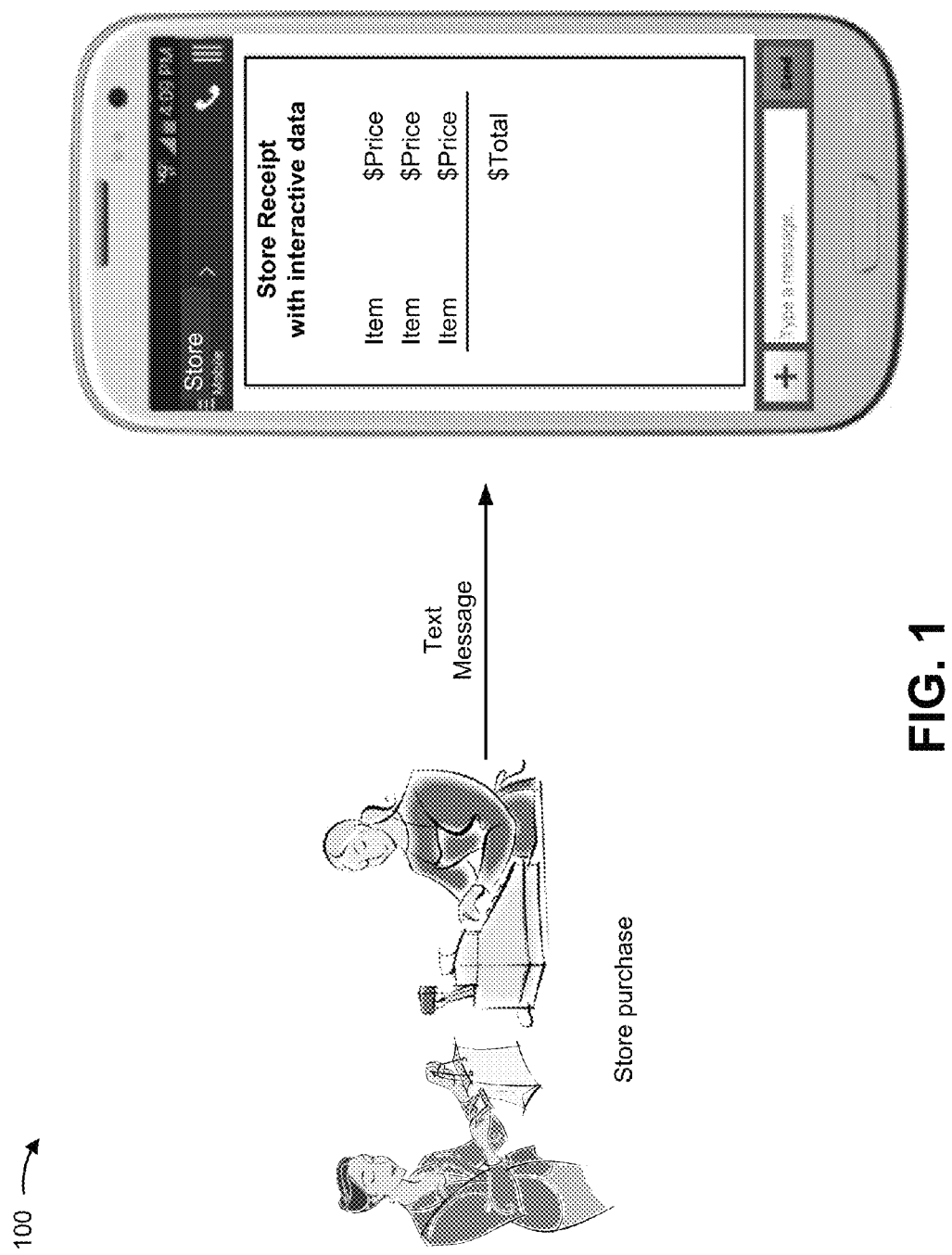
FIG. 1 is a diagram of an overview of an example implementation described herein.

The following detailed description of example implementations refers to the accompanying drawings. The same reference numbers in different drawings may identify the same or similar elements.

Typically, when a user purchases an item at a store, the user is provided with a paper receipt that includes purchase information and/or retailer information related to the purchase of the item. It may be necessary for the user to maintain the paper receipt in order for the user to track purchases (e.g., to track business related purchases, purchases made during a particular time period, etc.) and/or to return the item. If the paper receipt becomes lost or damaged, the user's ability to track purchases and/or return the item may be impacted. Even if the user is able to prevent the paper receipt from being lost or damaged, the paper receipt may become faded and/or unreadable over the passage of time. Further, to maintain the paper receipt, the user may store the paper receipt (e.g., in a file cabinet or a drawer at the user's home or place of employment) and the paper receipt may not be available to the user when the user attempts to return the item to the store.

Some stores may offer the user the option to receive a receipt electronically via an email sent to an email address provided by the user. Often, in addition to sending the receipt to the email address, the store will use the email address to periodically send the user email messages regarding current sales and/or promotional offers currently being provided by the store. When the user attempts to access the receipt, these additional emails sent by the store may make it difficult for the user to find the particular email that includes the receipt. Further, the user may be unable to access the email from the user's mobile device and, therefore, the receipt may be unavailable to the user when the user attempts to return the item unless the user remembers to print out a copy of the email prior to arriving at the store to make the return.

Systems and/or methods described herein may generate a virtual receipt that includes interactive data. The virtual receipt may be included in a text message, such as, for example, short message service (SMS) message or a multimedia messaging service (MMS) message. The text message may be received by a mobile device, such as a smart phone, that automatically organizes text messages into different conversations based on a sender and/or a recipient of the text message. Commonly, users are in the habit of carrying their mobile devices wherever the users go, thereby making the virtual receipt easily accessible to the users. Additionally, the interactive data may enable a user to easily obtain additional information regarding a purchased item (e.g., access an online version of a user manual) and/or perform certain actions related to the purchased item (e.g., provide the user with additional information regarding an item purchased and/or perform an action related to the item purchased (e.g., call customer service, send directions to the store to another user, etc.).

FIG. 1 is a diagram of an overview of an example implementation 100 described herein. For example implementation 100, assume that a consumer brings a set of items to a cashier, of a store, who is operating a cash register. Further, assume that the consumer has paid for the set of items and has provided her telephone number to the cashier in order to receive a receipt for the purchase via a text message. Assume further, that the cashier inputs the telephone number into the cash register. Referring now to FIG. 1, the cash register may determine that the purchase of the set of items is complete and may generate purchase data that includes the consumer's telephone number. The cash register may then cause the purchase data to be transmitted to a server device. The server device may receive the purchase data and may use the purchase data to generate a virtual receipt that includes interactive purchase information. The server device may generate a text message that includes the virtual receipt and may use the telephone number, included in the purchase data, to send the text message to the consumer. The consumer may receive the text message via a mobile device of the consumer.

Receiving the virtual receipt via a text message may allow the user to conveniently and easily access the virtual receipt when tracking purchases and/or returning a purchased item. Further, the text message may be organized in a conversation or window that is identified by a name of the store where the items were purchased, thereby allowing the user to easily locate the text message that includes the virtual receipt.

Figure 2:
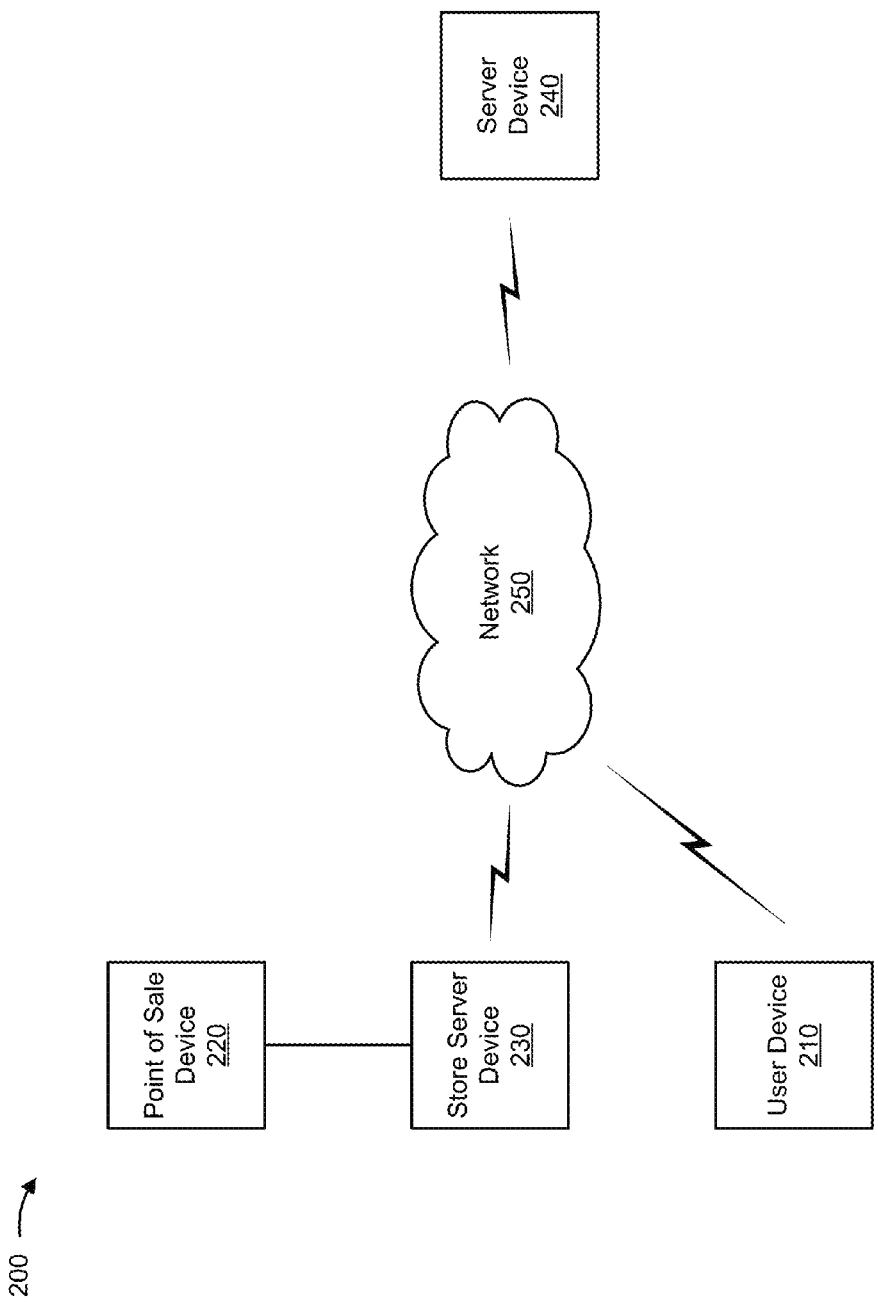
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a point of sale device 220, a store server device 230, and a server device 240 interconnected by network 250. Devices of environment 200 may interconnect via wired connections, wireless connections, or a combination of wired and wireless connections.

User device 210 may include a device capable of transmitting and/or receiving a text message. For example, user device 210 may include a mobile telephone (e.g., a smart phone, a radiotelephone, etc.), a computing device (e.g., a desktop computer, a laptop computer, a tablet computer, a handheld computer, etc.), a set top box, or another type of device capable of transmitting and/or receiving a text message.

Point of sale device 220 may include a device capable of generating purchase information related to a purchase of an item and/or transmitting the purchase information to store server device 230. For example, point of sale device 220 may include a cash register, a computing device (e.g., a desktop computer, a laptop computer, a tablet computer, a handheld computer, etc.), or another type of device capable of generating purchase information and/or providing the purchase information to store server device 230.

Store server device 230 include one or more computing devices, such as a server device or a collection of server devices. In some implementations, store server device 230 may receive purchase information from point of sale device 220 and may compile the purchase information received from point of sale device 220 to generate receipt data that includes information used for generating a virtual receipt. Store server device 230 may send the receipt data to server device 240.

Server device 240 may include one or more computing devices, such as a server device or a collection of server devices. In some implementations, server device 240 may generate a virtual receipt based on receipt data received from store server device 230 and may send the virtual receipt to user device 210 via a text message.

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
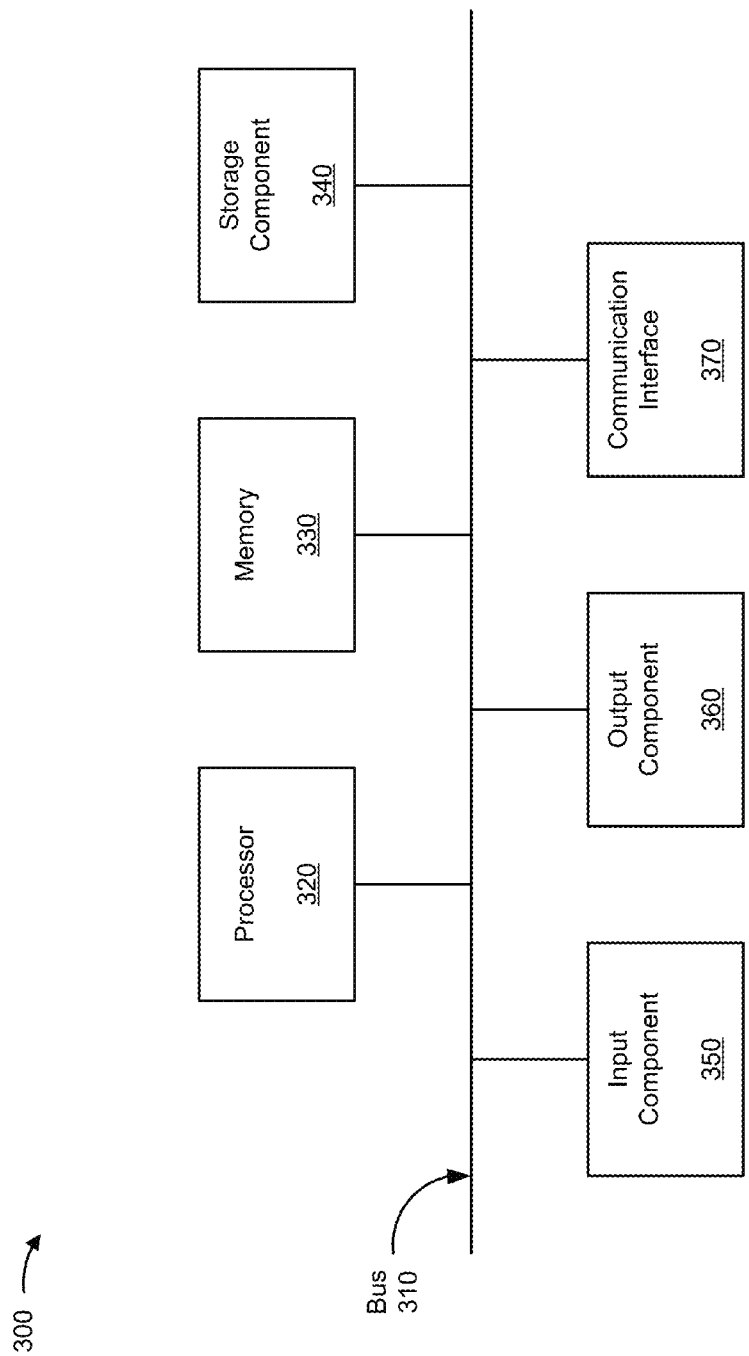
FIG. 3 is a diagram of example components of one or more devices of FIG. 2.

FIG. 3 is a diagram of example components of a device 300. Device 300 may correspond to user device 210, point of sale device 220, store server device 230, and/or server device 240. In some implementations, user device 210, point of sale device 220, store server device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
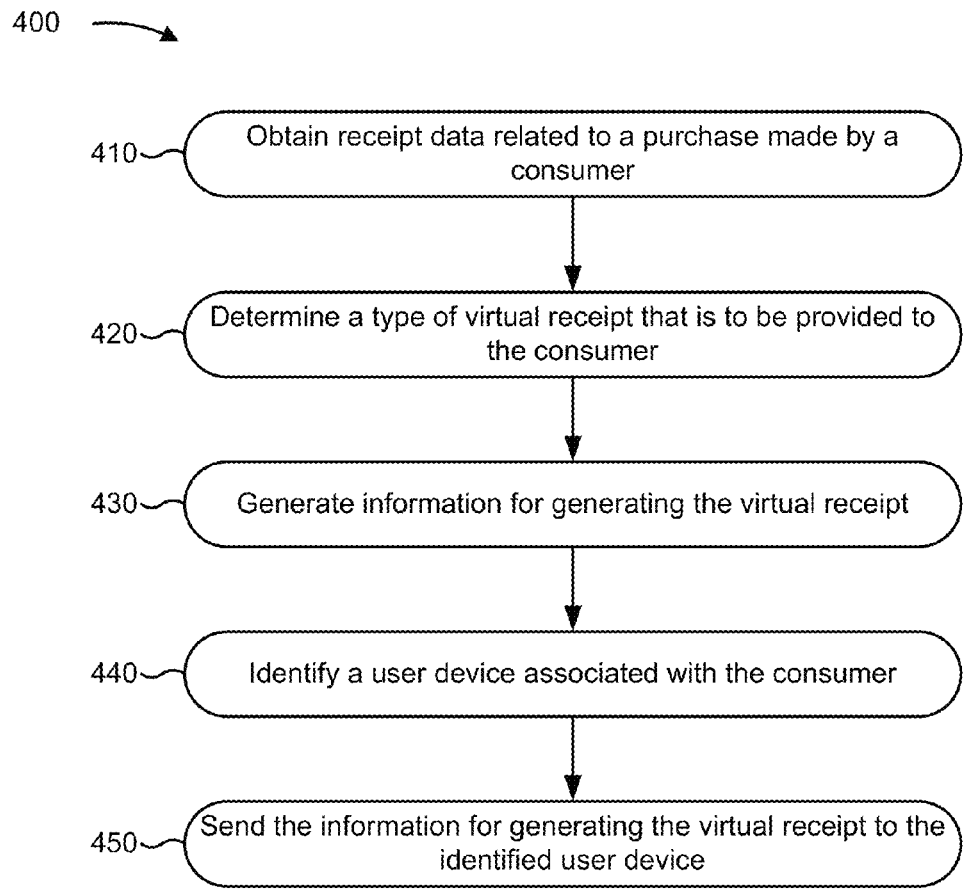
FIG. 4 is a flow chart of an example process for providing information for generating a virtual receipt associated with an item purchased by a consumer.

FIG. 4 is a flow chart of an example process 400 for providing information for generating a virtual receipt associated with an item purchased by a consumer. In some implementations, one or more process blocks of FIG. 4 may be performed by server device 240. Additionally, or alternatively, one or more process blocks of FIG. 4 may be performed by another device or a group of devices separate from or including server device 240, such as user device 210, point of sale device 220, and/or store server device 230.

As shown in FIG. 4, process 400 may include obtaining receipt data related to a purchase made by a consumer (block 410). For example, server device 240 may obtain receipt data related to a purchase made by a consumer. The receipt data may include purchase data, consumer data, and/or retailer data associated with the purchase of the item.

In some implementations, the purchase data may be related to the purchase of an item by the consumer. For example, the purchase data may include information identifying the item (e.g., a universal product code (UPC) code, a barcode, a skew code, a name of the item, etc.), information identifying a transaction associated with the purchase of the item (e.g., a transaction number or identifier, a date and/or time of the purchase, and/or other information that can be used to identify the purchase made by the consumer), a price of the item, an amount of a sales tax charged for the purchase of the item, a total amount paid by the consumer, a method of payment that was used to pay for the item (e.g., cash, credit card, gift card, store credit, loyalty/reward program incentive points, etc.), and/or other information related to the purchase of the item.

In some implementations, the consumer data may include information associated with a user device 210 that is associated with the consumer and/or information associated with the consumer. For example, the consumer data may include a telephone number associated with user device 210, a device identifier associated with user device 210 (e.g., a mobile device number (MDN), an international mobile subscriber identity (IMSI), an international mobile equipment identity (IMEI), an electronic serial number (ESN), a mobile identification number (MIN), a mobile subscriber integrated services digital network (MSISDN) number, etc.), information identifying the consumer (e.g., a name, username, etc.), a home and/or work address associated with the consumer, an email address associated with the consumer, a loyalty/reward program account number associated with the consumer, and/or another type of information that can be used to identify user device 210 and/or the consumer.

In some implementations, the retailer data may include information associated with a retailer or a store from which the item was purchased and/or promotional information. For example, the retailer data may include a name of the retailer, an address of a store at which the item was purchased, a telephone number associated with the retailer and/or the store (e.g., a telephone number for contacting a customer service representative, a telephone number for contacting a returns department, etc.), information identifying current and/or upcoming sales and/or promotions (e.g., sales or promotions related to the item), information for participating in a survey (e.g., a link to a website), product information associated with the item (e.g., information identifying a uniform resource locator (URL) for accessing an online version of a user manual, assembly instructions, operating instructions, product safety information, etc.), a website of the retailer, or the like.

In some implementations, server device 240 may obtain the receipt data from store server device 230. For example, store server device 230 may generate the receipt data and may provide the receipt data to server device 240. In some implementations, store server device 230 may generate the receipt data based on purchase data and/or consumer data received from point of sale device 220. For example, store server device 230 may receive the purchase data and/or the consumer data from point of sale device 220 and may analyze the received data to determine the item purchased and/or an identity of the consumer. Store server device 230 may identify information regarding a sale or a promotional event related to the item and/or the consumer and may generate the receipt data based on the purchase data, the consumer data, and/or the identified information.

Additionally, or alternatively, store server device 230 may generate one or more portions of the purchase data. For example, store server device 230 may receive receipt data from point of sale device 220. The receipt data may include purchase data that includes information identifying a transaction associated with the purchase of the item (e.g., a transaction number or identifier, a UPC code of the item purchased, a date and/or time of the purchase, etc.). Store server device 230 may use the received purchased data to retrieve information related to the purchase of the item (e.g., information identifying the item purchased, a price paid for the item, a method of payment used to purchase the item, etc.) from a memory (e.g., memory 330) and may generate additional purchase data, modify the received purchase data, and/or supplement the received purchased data based on the retrieved information.

In some implementations, server device 240 may obtain one or more portions of the receipt data from point of sale device 220. For example, point of sale device 220 may send the purchase data and/or the consumer data to server device 240. Server device 240 may receive the purchase data and/or the consumer data and may query store server device 230 to obtain retailer data related to the purchase of an item identified in the purchase data.

In some implementations, the receipt data may be obtained based on the purchase being made by the consumer. For example, store server device 230 and/or point of sale device 220 may determine that the consumer has purchased the item and may provide the receipt data to server device 240 based on the determination.

In some implementations, the receipt data may be obtained periodically. For example, store server device 230 and/or point of sale device 220 may generate receipt data for each item purchased via point of sale device 220. The generated receipt data may be stored in a memory (e.g., memory 330) and store server device 230 and/or point of sale device 220 may periodically (e.g., hourly, daily, after a particular number of purchases have been made, when an amount of memory used to store the receipt data exceeds a threshold amount of memory, etc.) provide the stored receipt data to server device 240.

As further shown in FIG. 4, process 400 may include determining a type of virtual receipt that is to be provided to the consumer (block 420). For example, server device 240 may determine a type of virtual receipt that is to be provided to the consumer and may generate information for generating the virtual receipt based on the determination.

In some implementations, the type of virtual receipt may include an interactive virtual receipt. The interactive virtual receipt may include interactive data. The interactive data may cause user device 210 to perform one or more actions, associated with the item, the consumer, and/or the purchase of the item by the consumer, when the interactive virtual receipt is provided for display and/or when the interactive data is selected by the consumer.

Additionally, or alternatively, the type of virtual receipt may include a non-interactive virtual receipt. The non-interactive virtual receipt may be a virtual receipt that does not include the interactive data. For example, the non-interactive virtual receipt may include an image of a receipt that depicts one or more portions of the purchase data, the customer data, and/or the retailer data.

In some implementations, the non-virtual receipt may include information for obtaining the interactive virtual receipt. For example, the image may include information identifying a website that the consumer can access to obtain the interactive virtual receipt and/or download an application for obtaining the interactive virtual receipt.

In some implementations, server device 240 may determine the type of virtual receipt based on a service provider associated with user device 210 and/or the consumer. For example, server device 240 may be associated with a particular service provider. Server device 240 may determine the type of virtual receipt based on whether user device 210 and/or the consumer is associated with the particular service provider.

In some implementations, server device 240 may determine whether user device 210 and/or the consumer is associated with the particular service provider based on the receipt data. For example, the receipt data may include consumer information that identifies a telephone number associated with user device 210. Server device 240 may determine whether user device 210 and/or the consumer is associated with the particular service provider based on the telephone number. In some implementations, server device 240 may determine to provide the non-interactive virtual receipt when user device 210 and/or the consumer is not associated with the particular service provider and may determine to provide the interactive virtual receipt when user device 210 and/or the consumer is associated with the particular service provider.

In some implementations, server device 240 may determine the type of virtual receipt to be provided based on a user profile associated with user device 210 and/or the consumer. For example, server device 240 may identify a user profile associated with user device 210 and/or the consumer based on consumer information included in the receipt data. Server device 240 may determine the type of virtual receipt to be provided based on information included in the user profile.

In some implementations, the user profile may include information indicating the type of virtual receipt to be provided. For example, the user profile may include preference information indicating whether the consumer desires to receive the interactive virtual receipt or the non-interactive virtual receipt, information indicating whether the application for obtaining the interactive virtual receipt has been downloaded and/or installed by user device 210, information indicating a type of virtual receipt to be provided to each user device 210, of a group of user devices 210, associated with the consumer, and/or other information for determining the type of virtual receipt to be provided.

In some implementations, server device 240 may determine the type of virtual receipt to be provided based on the receipt data. For example, the receipt data may include consumer information that indicates the type of virtual receipt to be provided.

As further shown in FIG. 4, process 400 may include generating information for generating the virtual receipt (block 430). For example, server device 240 may generate information for generating the virtual receipt based on determining the type of virtual receipt that is to be provided to user device 210.

In some implementations, the information for generating the virtual receipt may include image data for generating an image of a receipt and/or image data for generating the image of the receipt. For example, server device 240 may determine that the non-interactive virtual receipt is to be provided to user device 210 and server device 240 may generate and/or obtain data for generating the image of the receipt, such as, for example, a joint photographic experts group (JPEG) image of the receipt.

In some implementations, the image data may be generated based on the receipt data. For example, the receipt data may include information indicating one or more portions of the receipt data that are to be depicted in the image of the receipt. Server device 240 may analyze the receipt data to determine the one or more portions of the receipt data and may generate image data for generating an image of a receipt that depicts the one or more portions of the receipt data and/or may obtain the image data.

Additionally, or alternatively, the image data may be obtained from another device. For example, store server device 230 may determine that a non-interactive virtual receipt is to be provided based on the consumer information received from point of sale device 220. Store server device 230 may generate the image data based on the determination and may provide the image data to server device 240. In some implementations, the image data may be included in the receipt data. In some implementations, the image data may be provided separate from the receipt data.

In some implementations, server device 240 may determine that the interactive virtual receipt is to be provided and the information for generating the virtual receipt may include interactive data information. The interactive data information may identify a portion of the receipt data that is to be included in the interactive virtual receipt as an item of interactive data and/or information indicating that user device 210 is to perform a particular action when the interactive virtual receipt is provided for display and/or when the item of interactive data is selected by the consumer.

For example, the interactive data information may include information that identifies the portion of the receipt data, that identifies the particular action, and/or that enables user device 210 to generate the item of interactive data and/or perform the particular action. In some implementations, the interactive data information may include a set of instructions, executable code, text, hypertext, a link, a uniform resource locator (URL), and/or another type of information that identifies one or more portions of the receipt data, that identifies a corresponding particular action associated with a respective portion of the receipt data, and/or that enables user device 210 to generate the item of interactive data and/or perform the corresponding particular action associated with each portion of the receipt data. In some implementations, the interactive data information may be include a bar code, such as, for example, a one dimensional bar code, a multi-dimensional bar code (e.g., a Quick Response (QR) code), a UPC code, and/or another type of bar code.

In some implementations, the particular action may include an action related to obtaining information associated with the item, the consumer, and/or the purchase of the item by the consumer. For example, the interactive data information may include information indicating that the interactive virtual receipt is to include an item of interactive data that includes information identifying the item (e.g., a name of the item) and information that causes user device 210 to cause a web browser to access a particular web page (e.g., a web page that allows the consumer to read product reviews related to the item, access a user manual and/or assembly instructions for the item, or the like) when the interactive virtual receipt is provided for display and/or when the item of interactive data is selected by the consumer. The item of interactive data may provide the consumer with an easy and convenient method for obtaining relevant information regarding the item that can be easily accessed via user device 210.

Additionally, or alternatively, the particular action may include an action related to contacting the store from which the item was purchased. For example, the interactive data information may indicate that the interactive virtual receipt is to include an item of interactive data that includes information identifying a telephone number (e.g., a telephone number for contacting a customer service representative) and information that causes user device 210 to use the telephone number to place a telephone call when the interactive virtual receipt is provided for display and/or when the item of interactive data is selected by the consumer.

The item of interactive data may provide the consumer with a quick and convenient method for contacting the store. As an example, when the consumer desires to contact the store, the consumer may have to access the store's website via a web browser, navigate to a web page that includes the telephone number, write down/memorize/copy and paste the telephone number and then input the telephone number into user device 210. By enabling the consumer to contact the store by accessing the virtual receipt and selecting the item of interactive data, the item of interactive data may reduce the time, effort, and number of steps required for the consumer to contact the store.

Additionally, or alternatively, the particular action may include an action related to a promotional activity (e.g., a sale, a coupon, a survey, or the like) associated with the item, the consumer, a manufacturer of the item, and/or the store from which the item was purchased. For example, the interactive data information may indicate that the interactive virtual receipt is to include an item of interactive data that includes information requesting the consumer to participate in a survey regarding their purchase of the item and information that causes user device 210 to provide the survey to the consumer (e.g., causes user device 210 to cause a web browser to access a web page through which the consumer can complete the survey) when the interactive virtual receipt is provided for display and/or when the item of interactive data is selected by the consumer.

The item of interactive data may provide a convenient method for accessing information regarding a promotional activity. For example, the consumer may overlook, ignore, and/or fail to obtain additional information regarding a promotional activity included on a paper receipt due to not having access to a computer when the consumer first reads the information and/or the paper receipt being lost, damaged, or misplaced. The item of interactive data may allow the consumer, when initially viewing the information regarding the promotional activity included in the virtual receipt, to quickly and easily access the information regarding the promotional activity and, therefore, may lead to an increase in sales for the store, an increase in traffic to the store's website, and the like.

Additionally, or alternatively, the particular action may include an action related to obtaining store location information. For example, the interactive data information may indicate that the interactive virtual receipt is to include an item of interactive data that includes information identifying a name and/or an address of the store. The interactive data may include information that causes user device 210 to obtain map data and/or directions for traveling to the store when the interactive virtual receipt is provided for display and/or when the item of interactive data that includes the information identifying the address of the store is selected by the consumer.

The item of interactive data may provide the consumer with a quick and convenient method for contacting the store. As an example, when the consumer desires to obtain directions for traveling to the store, the consumer may have to access the a website via a web browser, navigate to a web page that includes the address of the store, write down/memorize/copy and paste the address, access a mapping/navigation application via a computer, and then input the address into the mapping/navigation application to obtain the directions. By enabling the consumer to obtain the directions by accessing the virtual receipt and/or selecting the item of interactive data, the item of interactive data may reduce the time, effort, and number of steps required for the consumer to obtain the directions.

In some implementations, the interactive data may include information that causes user device 210 to provide information identifying stores, included in a chain of stores associated with the store from which the item was purchased, within a certain distance of a current location of user device 210 (e.g., the consumer) and/or another location (e.g., a location input by the consumer via a user interface provided by user device 210) when the item of interactive data that includes the information identifying the name of the store is selected by the consumer.

Additionally, or alternatively, the particular action may include an action related to providing information to another person. For example, the interactive data information may indicate that the interactive virtual receipt is to include an item of interactive data for obtaining information that can be provided to another person and information that causes user device 210 to obtain the information, information identifying the other person and/or information identifying a method for providing the information to the other person (e.g., provide a user interface for inputting information identifying the other person and/or information identifying the method for providing the information to the other person), and/or causes user device 210 to provide the information to the other person when the interactive virtual receipt is provided for display and/or when the item of interactive data is selected by the consumer.

In some implementations, the particular action may include an action related to obtaining shipping information. For example, the interactive data information may indicate that the interactive virtual receipt is to include an item of interactive data that includes shipping information (e.g., a date of delivery, a name of a carrier responsible for shipping the item to the consumer and/or returning the item to the store, and the like) and information that causes user device 210 to obtain current and/or updated shipping information when the interactive virtual receipt is provided for display and/or when the item of interactive data is selected by the consumer. The item of interactive data may allow the consumer to obtain current shipping information by accessing the virtual receipt and/or selecting the item of interactive data.

As further shown in FIG. 4, process 400 may include identifying a user device associated with the consumer (block 440). For example, server device 240 may identify a user device 210 associated with the consumer based on the receipt data.

In some implementations, the receipt data may include consumer information that identifies a telephone number associated with user device 210. Server device 240 may parse the consumer information to determine the telephone number and may use the telephone number to send the text message to user device 210. Additionally, or alternatively, server device 240 may identify user device 210 in another way.

As further shown in FIG. 4, process 400 may sending the information for generating the virtual receipt to the identified user device (block 450). For example, server device 240 may identify user device 210 associated with the consumer and may send the information for generating the virtual receipt to user device 210.

In some implementations, the information for generating the virtual receipt may be sent via a text message. For example, server device 240 may generate a text message that includes the information for generating the virtual receipt. In some implementations, the text message may be a MMS message. For example, server device 240 may determine that user device 210 is to be provided the interactive virtual receipt. Server device 240 may send a form of bar code that includes the information associated with the interactive data to user device 210 via a MMS message.

Additionally, or alternatively, the text message may be a SMS message. For example, server device 240 may determine that user device 210 is to be provided the non-interactive virtual receipt. Server device 240 may send image data for generating the image of the receipt to user device 210 via a SMS message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
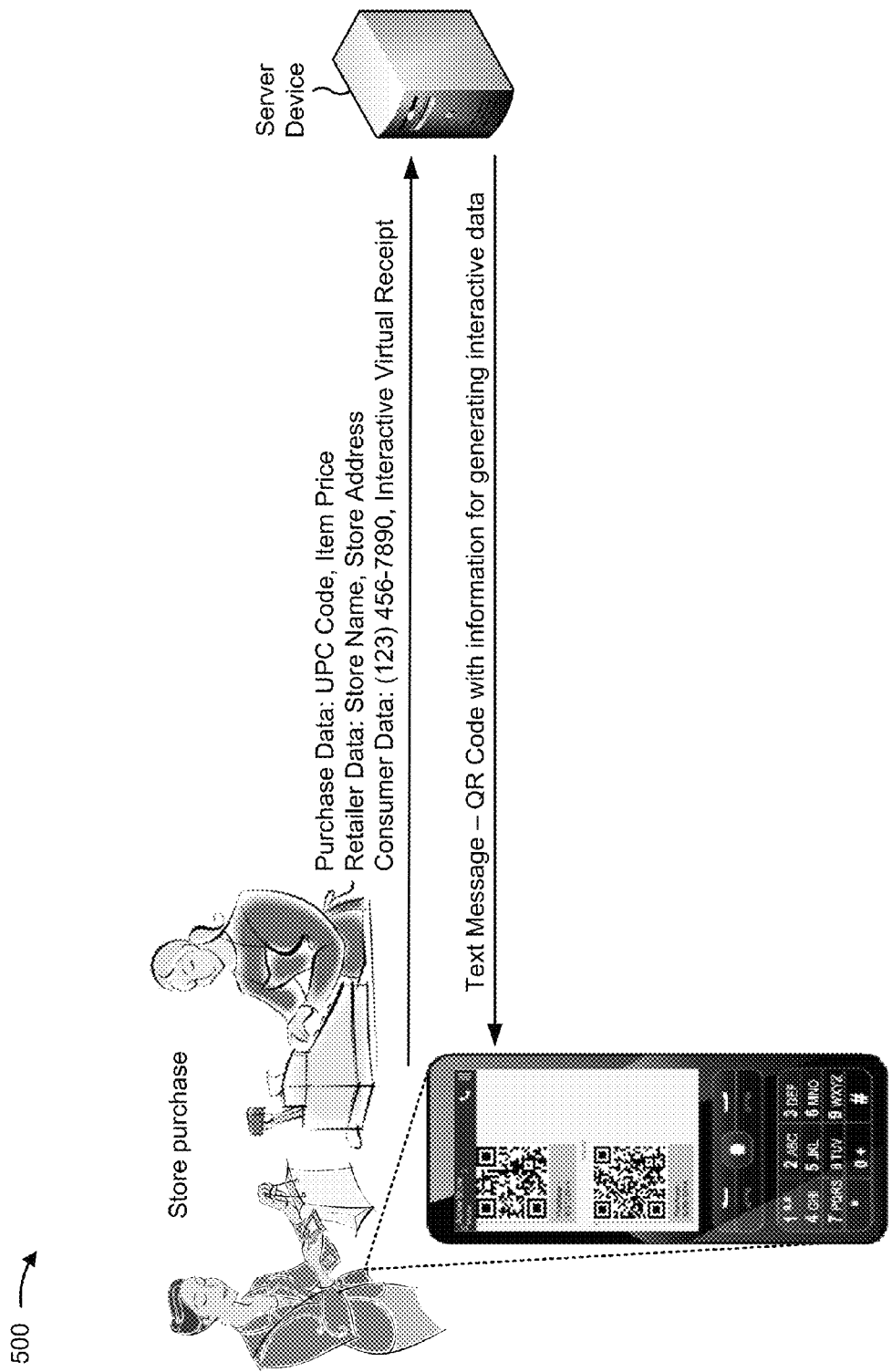
FIG. 5 is a diagram of an example implementation relating to the example process shown in FIG. 4.

FIG. 5 is a diagram of an example implementation 500 relating to example process 400 shown in FIG. 4. FIG. 5 shows an example of providing information for generating a virtual receipt associated with an item purchased by a consumer. For FIG. 5, assume that a consumer is purchasing an item from a store and has indicated that an interactive virtual receipt is to be provided. Further, assume that the consumer has provided her telephone number to a cashier operating a cash register (e.g., point of sale device 220) and that the cashier has input the telephone number into the cash register. Referring to FIG. 5, the consumer may pay for the items and the cashier may complete the sale of the item using the cash register. The cash register may determine that the purchase of the item is complete and may provide receipt data to a server device (e.g., server device 240).

As shown in FIG. 5, the receipt data may include purchase data that identifies a UPC code of the item and a purchase price of the item, retailer data that identifies a name of the store from which the item was purchased and an address of the store, and consumer data that identifies the consumer's telephone number and that an interactive virtual receipt is to be provided. The server device may receive the receipt data and use the receipt data to generate the information for generating the interactive virtual receipt. As further shown in FIG. 5, the information for generating the interactive virtual receipt may include a QR code with instructions for generating interactive data. The server device may include the QR code in a text message and may send the text message using the telephone number included in the consumer data.

As indicated above, FIG. 5 is provided merely as an example. Other examples are possible and may differ from what was described with regard to FIG. 5.

Figure 6:
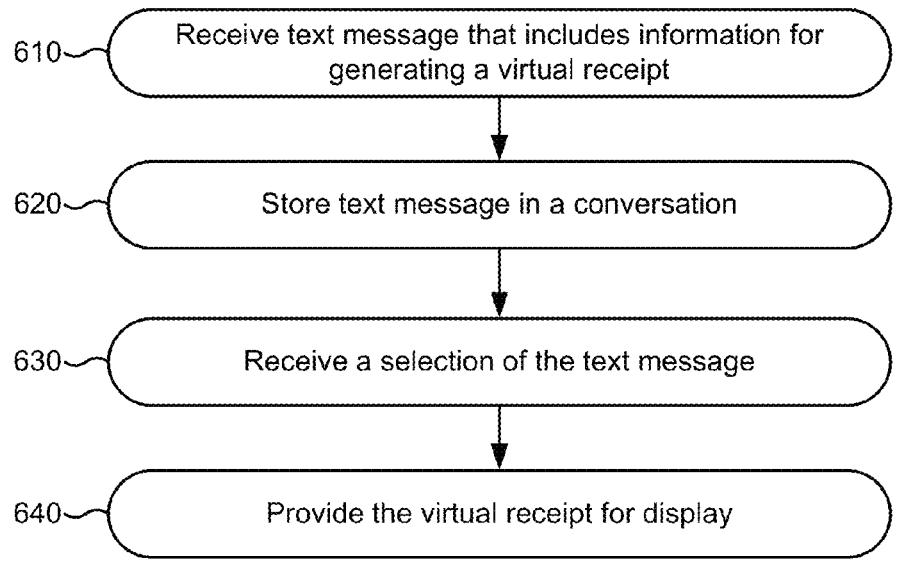
FIG. 6 is a flow chart of an example process for providing a virtual receipt associated with an item purchased by a consumer.

FIG. 6 is a flow chart of an example process 600 for providing a virtual receipt associated with an item purchased by a consumer. In some implementations, one or more process blocks of FIG. 6 may be performed by user device 210. In some implementations, one or more process blocks of FIG. 6 may be performed by another device or a group of devices separate from or including user device 210, such as point of sale device 220, store server device 230, and/or server device 240.

As shown in FIG. 6, process 600 may include receiving a text message that includes information for generating a virtual receipt (block 610) and storing the text message in a conversation (block 620). For example, a consumer may purchase an item from a store and may elect to receive a virtual receipt. Based on the election, information for generating a virtual receipt may be generated (e.g., by server device 240 as described above in connection with FIG. 4) and user device 210 may receive the text message that includes the information for generating the virtual receipt from server device 240. User device 210 may determine that the text message is associated with the store from which the item was purchased and may store the text message in association with a conversation associated with the store.

As further shown in FIG. 6, process 600 may include receiving a selection of the text message (block 630). For example, user device 210 may receive a selection of the text message made by the consumer.

In some implementations, the selection may be received via a messaging application. For example, the consumer may desire to access a virtual receipt included in a text message received by user device 210. The consumer may access the messaging application and user device 210 may cause a list of windows and/or groupings of related text messages (referred to herein as "conversations") to be displayed. The consumer may select the text message via the list of conversations.

In some implementations, the text message may be the only text message associated with a particular conversation and a selection of the particular conversation may correspond to the selection of the text message. For example, the consumer may select the particular conversation from the list of conversations. User device 210 may receive the selection of the particular conversation and may determine that the text message is the only text message associated with the particular conversation. User device 210 may determine that the selection of the particular conversation corresponds to a selection of the text message based on the text message being the only text message associated with the particular conversation. User device 210 may cause information associated with the text message to be displayed based on the selection of the particular conversation corresponding to the selection of the text message.

In some implementations, the text message may be included in a group of text messages associated with the particular conversation. For example, over a period of time, the consumer may make several separate purchases of items from a particular store and/or retailer. Upon the completion of each purchase, user device 210 may receive a text message that includes a virtual receipt for the purchased item. User device 210 may determine that each text message is associated with the particular store and/or retailer and may store each text message in association with the particular conversation. The consumer may identify the particular conversation as being associated with the particular store and/or retailer from which the item was purchased and may select the particular conversation from the list of conversations. User device 210 may receive the selection and may identify the group of text messages based on the group of text messages being stored in association with the particular conversation. User device 210 may cause information associated with each text message, of the group of text messages, to be provided for display and may receive a selection of information associated with one of the text messages.

In some implementations, the information associated with the text message may include a representation of the virtual receipt that was included in the text message and/or generated based on the information for generating the virtual receipt. For example, the text message may include a bar code that includes instructions for generating the interactive virtual receipt. User device 210 may cause the bar code to be displayed to the consumer in response to the selection of the text message.

Additionally, or alternatively, the representation of the virtual receipt may include an image of a receipt. For example, the text message may include image data for generating the image of the receipt. User device 210 may obtain the image data from the text message and may use the image data to generate the image of the receipt. User device 210 may cause the image of the receipt to be displayed based on receiving the selection of the text message.

In some implementations, the representation of the virtual receipt may enable the consumer to perform one or more actions related to the purchase of the item. For example, the representation of the virtual receipt may include the bar code (e.g., a QR code). When making a return (e.g., returning the item to the store from which the item was purchased), the consumer may be required to provide a copy of a receipt evidencing the purchase of the item from the store. The consumer may select the text message to cause the bar code to be displayed via user device 210. The bar code may be input (e.g., scanned) into point of sale device 220. The bar code may include instructions for obtaining one or more portions of the receipt data (e.g., the purchase data, information identifying a transaction associated with the purchase of the item, or the like) and/or may include the one or more portions of the receipt data. Point of sale device 220 may utilize the bar code to obtain the one or more portions of the receipt data and/or other information necessary in order for the consumer to return the item and may utilize the obtained information to complete a transaction associated with the return of the item.

As further shown in FIG. 6, process 600 may include providing the virtual receipt for display (block 640). For example, user device 210 may generate the virtual receipt based on the information for generating the virtual receipt and may provide the virtual receipt for display in response to receiving the selection of the text message.

In some implementations, the virtual receipt may include the non-interactive virtual receipt and the non-interactive virtual receipt may be provided for display. For example, user device 210 may determine that the text message includes the image data for generating the image of the receipt. User device 210 may use the image data to generate the image of the receipt and may provide the image of the receipt for display.

Additionally, or alternatively, the non-interactive virtual receipt may include information for obtaining an interactive virtual receipt. For example, the text message may include the information for obtaining the interactive virtual receipt and user device 210 may provide the information for obtaining the interactive virtual receipt for display based on receiving the selection of the text message.

In some implementations, the information for obtaining the interactive virtual receipt may be displayed in conjunction with the non-interactive virtual receipt. For example, user device 210 may cause the image of the receipt to be provided for display. The image of the receipt may depict and/or include instructions for enabling the consumer to obtain the interactive virtual receipt (e.g., information identifying a web site from which the interactive virtual receipt can be accessed, information identifying an application that can be downloaded and used to obtain the interactive virtual receipt, or the like).

Additionally, or alternatively, the information for obtaining the interactive virtual receipt may be provided separate from the image of the receipt. For example, the non-interactive virtual receipt may be provided in a first window and the information for obtaining the interactive virtual receipt may be provided in a second, different window (e.g., a pop-up window).

In some implementations, the consumer may use the information for obtaining the interactive virtual receipt to cause subsequent virtual receipts to be the interactive virtual receipt. For example, the information for obtaining the interactive virtual receipt may include a link for downloading an application for obtaining the interactive virtual receipt. The consumer may select the link to download the application and the downloaded application may be installed on user device 210. When determining the type of virtual receipt to be provided for subsequent purchases made by the consumer, server device 240 may determine to provide the interactive virtual receipt based on the application having been downloaded and/or installed on user device 210.

In some implementations, server device 240 may determine that the application has been downloaded and/or installed based on information received from user device 210. For example, after downloading and/or installing the application, user device 210 may send information indicating that the application has been downloaded and/or installed. Server device 240 may store information indicating that the application has been downloaded and/or installed in a user profile associated with user device 210 and/or the consumer. Upon receiving subsequent receipt data associated with user device 210 and/or the consumer, server device 240 may determine to provide the interactive virtual receipt to user device 210 based on the information, indicating that the application has been downloaded and/or installed, being stored in the user profile.

Additionally, or alternatively, server device 240 may determine that the application has been downloaded and/or installed based on information received from another device. For example, when the consumer makes a subsequent purchase for which a virtual receipt is to be provided, information indicating that the application has been downloaded and/or installed may be input into point of sale device 220. The information indicating that the application has been downloaded and/or installed may then be included in receipt data associated with the subsequent purchase (e.g., by point of sale device 220 and/or store server device 230). Server device 240 may receive the receipt data, including the information indicating that the application has been downloaded and/or installed, from point of sale device 220 and/or store server device 230.

In some implementations, the virtual receipt may include the interactive virtual receipt and user device 210 may provide the interactive virtual receipt for display to the consumer. For example, the text message may include a bar code that includes the interactive data information. The interactive data information may include receipt data, information associated with the interactive data, and/or instructions for generating the interactive virtual receipt. User device 210 may generate the interactive virtual receipt based on the receipt data, the information associated with the interactive data, and/or the instructions for generating the interactive virtual receipt and may provide the interactive virtual receipt for display.

In some implementations, the information for generating the interactive virtual receipt may include configuration information related to providing the interactive virtual receipt for display. For example, the information for generating the interactive virtual receipt may include information indicating portions of the receipt data that are to be included in particular sections of the interactive virtual receipt, display information (e.g., information indicating a size of a display of the interactive virtual receipt, information indicating a position on a display at which different portions of the receipt data are to be provided for display, information identifying a color of text, lines, sections, etc., of the interactive virtual receipt, or the like), and/or other information associated with providing the interactive virtual receipt for display.

In some implementations, the interactive virtual receipt may include interactive data for performing actions related to respective items of interactive data. In some implementations, server device 240 may identify one or more of the actions that are to be performed when the interactive virtual receipt is provided for display and may perform the identified actions.

For example, the item may have been purchased online, and the interactive virtual receipt may include interactive shipping data for obtaining shipping information related to the item. Based on receiving the selection of the text message, user device 210 may determine that the interactive virtual receipt includes the interactive shipping data and may obtain current/updated shipping information from a carrier responsible for the shipment of the item to the consumer. User device 210 may cause the current/updated shipping information to be provided via the interactive virtual receipt when the interactive virtual receipt is provided for display to the consumer.

Additionally, or alternatively, the interactive virtual receipt may include interactive data for performing actions based on receiving a selection of a respective item of interactive data. User device 210 may receive a selection of an item of interactive data and may perform an action associated with the item of interactive data. For example, the virtual receipt may include an item of interactive data for performing a particular action when the item of interactive data is selected by the consumer. User device 210 may determine a location of the item of interactive data within the virtual receipt and/or on a display associated with user device 210 and may store information indicating that the action is to be performed when an input is received at the determined location.

In some implementations, user device 210 may include a touch-screen display and the selection may comprise a touch made on the touch-screen display. For example, the consumer may select the interactive data by touching a portion of the display on which the interactive data is displayed. User device 210 may determine a location at which the displayed was touched and may determine that the location at which the display was touched corresponds to the location of the interactive data based on the stored information. Additionally, or alternatively, the selection may be made via another method. For example, the consumer may use a pointing device, such as, for example, a mouse, to select the interactive data.

In some implementations, the particular action may include obtaining information related to the item. For example, the interactive virtual receipt may include a list of names of items purchased by the consumer. Each name may include an item of interactive data that can be selected to access a web page that provides product information (e.g., a user's manual, assembly instructions, safety recall information, information regarding related products, product reviews, or another form of product information) for the corresponding item, shipping information related to a shipment of the item to the consumer and/or a return of the item. User device 210 may determine that a particular item of interactive data has been selected and may obtain the information related to the item based on the selection.

In some implementations, the particular action may include obtaining information related to the method of payment used to purchase the item. For example, the item of interactive virtual receipt may include information identifying the method of payment used to purchase the item. The information identifying the method of payment may include an item of interactive data that can be selected to access financial information associated with the consumer (e.g., a website of a credit card company issuing the credit card used to purchase the item, a website of a bank on which a check used to purchase the item was drawn, etc.). User device 210 may determine that the item of interactive data has been selected and may obtain the information related to the method of payment based on the selection.

In some implementations, the action may include obtaining information related to a location of the store at which the item was purchased. For example, the interactive virtual receipt may include information identifying an address of the store at which the item was purchased. The information identifying the address may include an item of interactive data that can be selected to obtain map data related to the location of the store. User device 210 may determine that the item of interactive data has been selected and may obtain the map data based on the selection.

In some implementations, the map data may include driving directions for traveling to the store from a particular location (e.g., a location input by the consumer, a current location of user device 210 and/or the consumer, a location of a person identified by the consumer, etc.). In some implementations, the store may be included in a chain of stores associated with a particular retailer and the map data may include information identifying a location of one or more stores included in the chain of stores (e.g., stores located within a certain distance of a current location of user device 210 and/or the consumer, stores located within certain distance of a location identified by the user, etc.).

In some implementations, the action may include placing a telephone call. For example, the interactive virtual receipt may include an item of interactive data that includes information identifying a telephone number, such as, for example, a telephone number for contacting a customer service representative of the store from which the item was purchased. User device 210 may determine that the item of interactive data was selected and may cause a telephone call to be placed based on the selection. The item of interactive data may cause the number of steps required to place the telephone call to be reduced.

In some implementations, the action may include sending information to another user (e.g., another user device 210). For example, one or more items of interactive data included in the virtual receipt may include an option that, when selected, causes information obtained as a result of performing the action associated with the item of interactive data, to be provided to a another person (e.g., another user device 210). In some implementations, the item of interactive data, when selected, may enable the consumer to specify the particular user and/or a method for providing the information to the particular user. For example, user device 210 may determine that a particular item of interactive data was selected and that the consumer desires to send information, obtained by user device 210 performing an action related to the item of interactive data, to another user. User device 210 may provide a user interface through which information identifying the other user, a method for providing the information to the other user (e.g., via text message, email, etc.), and/or additional information (e.g., a message from the consumer to the other user) to be provided to the other user in conjunction with the obtained information can be input by the consumer.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of accessing a virtual receipt to perform an action related to an item purchased by a consumer.

For example implementation 700, assume that a user has recently purchased a pair of sneakers from a store ("The Shoe Store") and has received a text message (e.g., from server device 240) that includes an interactive virtual receipt relating to the purchase. Further, assume that the user desires to access the interactive virtual receipt to obtain additional information regarding the sneakers from a website of the store. Assume further that the user has accessed a messaging application executing on a user device (e.g., user device 210) and that the user device has provided a list of conversations for display.

Figure 7A:
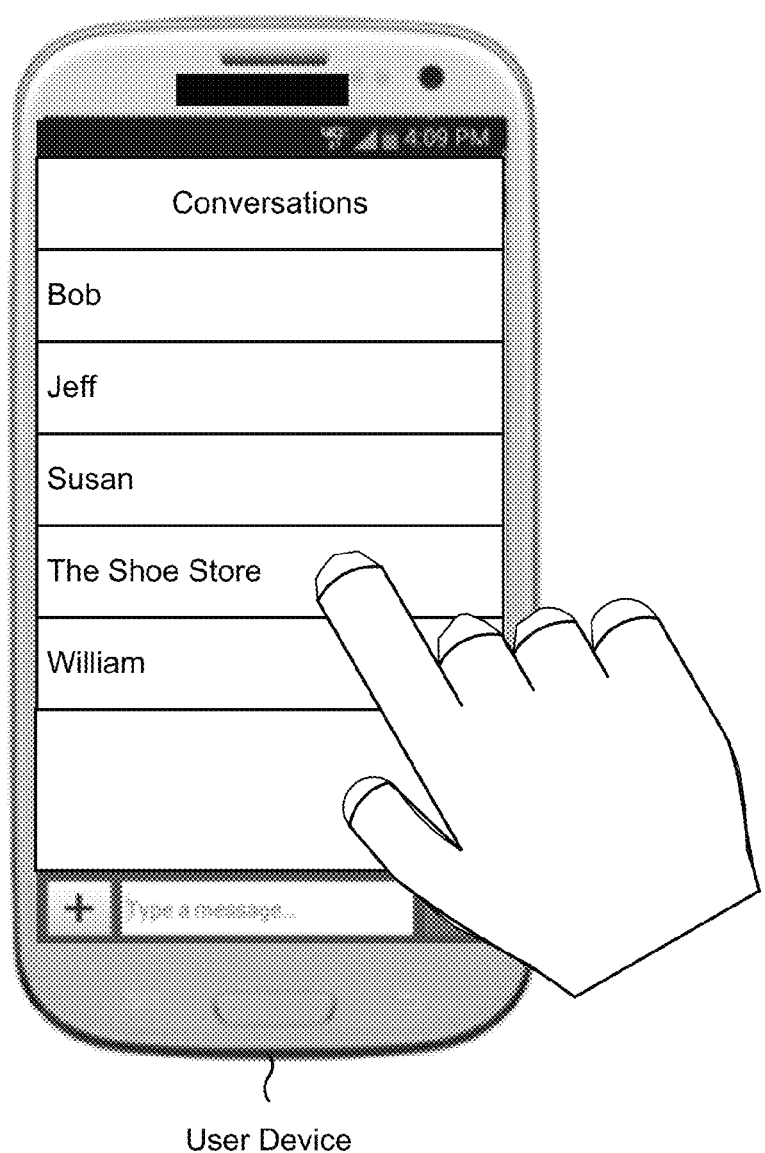
FIGS. 7A-7D are diagrams of an example implementation relating to the example process shown in FIG. 6.
Figure 7B:
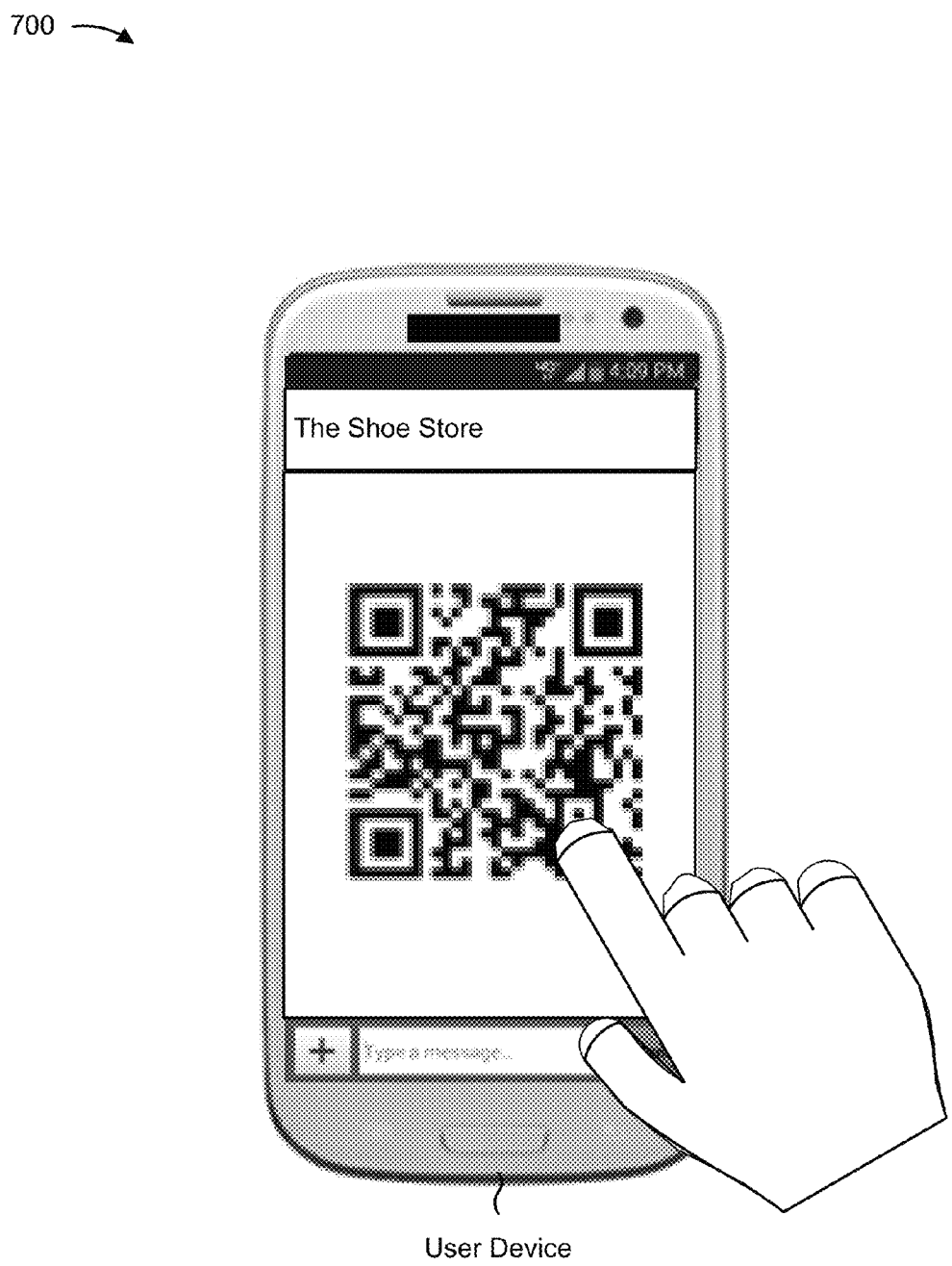

As shown in FIG. 7A, the user may identify a conversation associated with the store from which the sneakers were purchased from the list of conversations and may select the identified conversation. Referring to FIG. 7B, the user device may receive the selection and may identify a text message associated with the selected conversation. The user device may determine that the text message includes a virtual receipt and may provide a representation of the virtual receipt for display. As shown in FIG. 7B, the user device provides a QR code for display to the user and the user selects the QR barcode to cause the user device to provide the virtual receipt for display.

Figure 7C:
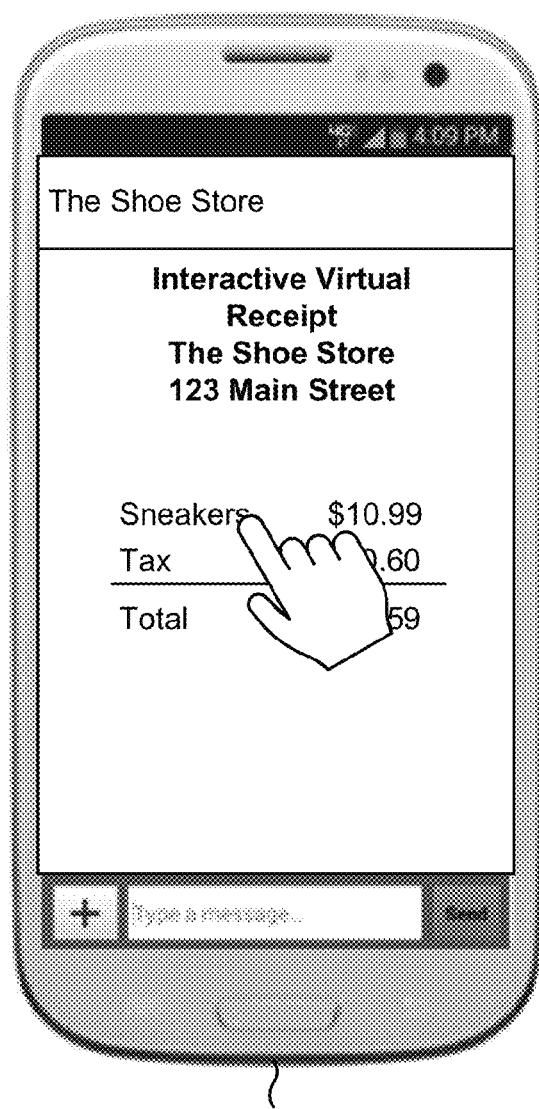
Figure 7D:

Referring to FIG. 7C, based on receiving the selection of the QR code, the user device may cause an interactive virtual receipt to be provided for display to the user. The interactive virtual receipt may include interactive data for performing one or more actions related to the purchase of the sneakers from The Shoe Store. As shown in FIG. 7C, the user selects the name of the item, which includes interactive data, to obtain additional information regarding the sneakers. Referring to FIG. 7D, based on the selection of the interactive data, the user device may cause a product web page that includes information regarding the sneakers to be displayed to the user.

As indicated above, FIGS. 7A-7D are provided merely as an example. Other examples are possible and may differ from what was described with regard to FIGS. 7A-7D.

Receiving a virtual receipt via a text message provides a consumer with a receipt for a purchased item that can be easily accessed. Further, when the text message is received, the user device receiving the text message stores the text message in a conversation, folder, window, etc. associated with the store and/or retailer from which the item is purchased, thereby providing the consumer with a method for organizing and sorting virtual receipts without any input being required from the consumer.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
   one or more processors to:
     obtain receipt data associated with a purchase of an item;
     determine a user device associated with the receipt data;
     determine a type of virtual receipt to be provided to the user device based on a service provider associated with the user device;
     generate information for generating a virtual receipt based on the receipt data and the type of virtual receipt; and
     send a text message, that includes the information for generating the virtual receipt, to the user device,
       the information for generating the virtual receipt permitting the user device to generate the virtual receipt.

2. The device of claim 1, where, when generating the information for generating the virtual receipt, the one or more processors are to:

generate information associated with interactive data that causes the user device to perform an action related to one or more of:
the item,
the purchase of the item by a consumer, or
the consumer.

3. The device of claim 1, where, when generating the information for generating the virtual receipt, the one or more processors are to:
generate information for generating one or more of:
an image of a receipt, or
a bar code that includes information for generating an item of interactive data.

4. The device of claim 1, where, when generating the information for generating the virtual receipt, the one or more processors are to:
determine whether a particular application has been downloaded or installed by the user device, and
selectively generate an interactive virtual receipt based on whether the application has been downloaded or installed by the user device,
the interactive virtual receipt being generated when the application has been downloaded or installed by the user device.

5. The device of claim 1, where, when generating the information for generating the virtual receipt, the one or more processors are to:
generate information for generating a non-interactive virtual receipt that includes information for obtaining an interactive virtual receipt.

6. The device of claim 1, where, when sending the text message, the one or more processors are to:
send one or more of:
a short message service message, that includes information for generating a non-interactive virtual receipt, to the user device, or
a multimedia service message, that includes information for generating an interactive virtual receipt, to the user device.

7. The device of claim 1, where the one or more processors are further to:
determine the service provider associated with the user device based on a telephone number for the user device.

8. A non-transitory computer-readable medium storing instructions, the instructions comprising:
one or more instructions that, when executed by one or more processors, cause the one or more processors to:
obtain receipt data associated with a purchase of an item,
the receipt data including information identifying a user device associated with the purchase of the item;
determine a type of virtual receipt to be provided to the user device based on a service provider associated with the user device;
generate information for generating a virtual receipt based on the receipt data and the type of virtual receipt; and
send a text message, that includes the information for generating the virtual receipt, to the user device,
the information for generating the virtual receipt causing the user device to present the virtual receipt for display.

9. The non-transitory computer-readable medium of claim 8, where the one or more instructions to obtain the receipt data include:
one or more instructions that, when executed by the one or more processors, cause the one or more processors to:
obtain image data for generating an image of a receipt relating to the purchase of the item.

10. The non-transitory computer-readable medium of claim 8, where the one or more instructions to generate the information for generating the virtual receipt include:
one or more instructions that, when executed by the one or more processors, cause the one or more processors to:
generate information associated with an item of interactive data that, when selected, causes the user device to perform an action when the virtual receipt is provided for display.

11. The non-transitory computer-readable medium of claim 8, where the one or more instructions to generate the information for generating the virtual receipt include:
one or more instructions that, when executed by the one or more processors, cause the one or more processors to:
generate information associated with an item of interactive data that, when selected, causes the user device to perform an action when the item of interactive data is selected by a user.

12. The non-transitory computer-readable medium of claim 8, where the one or more instructions to generate the information for generating the virtual receipt include:
one or more instructions that, when executed by the one or more processors, cause the one or more processors to:
generate a bar code that includes information for generating one or more items of interactive data relating to the virtual receipt.

13. The non-transitory computer-readable medium of claim 12, where the one or more instructions to generate the bar code include:
one or more instructions that, when executed by the one or more processors, cause the one or more processors to:
generate a multi-dimensional bar code that embeds information relating to the item or to a retailer from which the item was purchased.

14. The non-transitory computer-readable medium of claim 8, where the one or more instructions to send the text message include:
one or more instructions that, when executed by the one or more processors, cause the one or more processors to:
send a multimedia service message, that includes the information for generating the virtual receipt, to the user device.

15. A method comprising:
obtaining, by a device, a text message that includes information for generating a virtual receipt associated with a purchase of an item,
a type of virtual receipt to be generated being determined based on a service provider associated with the device;
receiving, by the device, a selection of the text message;
generating, by the device, the virtual receipt based on the information for generating the virtual receipt and based on the selection of the text message,
the virtual receipt including an item of interactive data associated with performing a particular action;
determining, by the device, a selection of the item of interactive data; and
performing, by the device, the particular action based on the selection.

16. The method of claim 15, where performing the particular action includes:
causing a web browser to access a web page for obtaining information associated with the item.

17. The method of claim 15, where receiving the information for generating the virtual receipt includes:

receiving a bar code that includes a set of instructions for generating the virtual receipt.

18. The method of claim 15, further comprising:
providing a representation of the virtual receipt for display based on receiving the selection of the text message; and
receiving a selection of the representation of the virtual receipt; and
where generating the virtual receipt includes:
generating the virtual receipt based on receiving the selection of the representation of the virtual receipt.

19. The method of claim 18, where providing the representation of the virtual receipt for display includes:
providing a bar code for display,
where the bar code embeds information relating to at least one of the item or a retailer from which the item was purchased.

20. The method of claim 15, where the item of interactive data comprises a first item of interactive data and the action comprises a first action, the method further comprising:
determining that the virtual receipt includes a second item of interactive data associated with a second action; and
performing the second action before providing the virtual receipt for display; and
where generating the virtual receipt includes:
including information obtained based on performing the second action in the virtual receipt.

\* \* \* \* \*